United States Patent Office 3,104,166
Patented Sept. 17, 1963

3,104,166
PRODUCTION AND SEPARATION OF MOLTEN CERIUM FROM ITS REDUCING METAL CHLORIDE WHICH IS IN SOLID FORM
William E. Domning, Midland, Mich., assignor to The Dow Chemical Company, Midland, Mich., a corporation of Delaware
No Drawing. Filed Mar. 2, 1961, Ser. No. 92,742
3 Claims. (Cl. 75—84.5)

The invention relates to the preparation of cerium from the simple chloride thereof and more particularly relates to an improvement in the method of separating cerium from the reaction mixture formed in the reduction reaction.

Heretofore difficulties have been encountered in separating and recovering highly pure cerium from a reduction reaction mixture containing cerium and reductor metal chloride as well as unreacted reductor metal and cerium chloride. Such separations have been tedious or incomplete.

It is therefore a principal object of the invention to provide an improved method of separating cerium from a reduction reaction mixture in which the cerium is formed whereby subsequent purification of the cerium is greatly simplified.

It has now been found that upon reacting cerium chloride with a suitable reductor metal, either sodium or barium, at an elevated temperature, e.g., 400–600° C., and under an inert atmosphere, thereby forming cerium and reductor metal chloride, and thereafter draining away the cerium, while it is molten, from the reaction mixture, subsequent purification of the cerium by selective volatilization of impurities is greatly facilitated.

A suitable type of reaction vessel is one equipped with means for filtering molten cerium from the reaction mixture, preferably at the end of the reaction period. The reaction vessel is also provided with heating means, such as electrical resistance heaters, with connections to a vacuum pump and to a supply of dry inert gas, as well as connections to admit cerium chloride and reductor metal.

A type of vessel equipped for simple gravity filtration is a closed cylindrical one formed of tantalum or other chemically resistant material and having press fitted therein and welded thereto a plate formed of tantalum, ceramic, or other inert materials, which is mounted transversely across the vessel about midway the ends dividing the vessel into two chambers, an upper chamber and a lower one. The so-mounted plate is foraminous, being pierced at numerous places with drill holes each about 0.01 to 0.05 inch in diameter so that the plate serves as a coarse filter for gravity flow filtration, though a finer filter may be used, if desired. The reaction vessel is mounted and arranged so that it can be inverted to carry out the gravity flow filtration at the end of the reaction period.

In carrying out the method of the invention in the apparatus described above a charge of cerium chloride is placed in the lower portion of the reaction vessel. For convenience the cerium chloride may be sublimed directly into the reaction vessel after purging the vessel with an inert gas such as helium or argon. An inert atmosphere is maintained in the reactor vessel thereafter during the process.

Then the requisite amount of reductor metal to provide about the stoichiometric amount based on the weight of the cerium chloride but more preferably about 95 percent of the stoichiometric amount, is added to the charge of cerium chloride. Although either barium or sodium may be used in the present process, sodium is preferred because of its ready volatility, availability, and lower cost. Sodium is conveniently distilled directly onto the charge of cerium chloride in the reaction vessel.

The reaction mixture is then heated to about 400° C. at which temperature the reduction reaction is allowed to proceed for from 3 to 10 hours. During this period a reaction mixture is formed in which the reactants and products are present at substantially equilibrium concentrations, the reduction reaction being generally 70 to 80 percent complete. The reaction mixture thus contains cerium, sodium chloride and unreacted sodium and cerium chloride.

The reaction mixture is then heated to and maintained at a temperature of about 740° to 760° C. for about 30 minutes or more in order to melt the impure cerium, which in high purity melts at about 775° C., but essentially below the melting temperature of impure sodium chloride containing some cerium chloride. Pure sodium chloride melts at about 800° C., but the presence of cerium chloride may bring this melting temperature down to 780° C. Therefore careful temperature control is required to keep the sodium chloride in solid form while the cerium becomes molten.

At the end of this melting period the molten cerium is separated from solids in the reaction mixture, i.e., principally sodium chloride by filtering the mixture. With the reaction apparatus described above this is accomplished by inverting the reaction vessel, whereupon the lower density salts float upon the molten cerium until it drains through the perforated plate.

The present process may also be carried out, if desired, in a reaction vessel which is equipped to filter the reaction mixture in other ways, e.g., by vacuum or pressure filtration. In this type of vessel the reactants are usually positioned and reacted above the filter and the vessel need not be inverted to carry out filtration. For this manner of operation there is required a relatively fine filter having openings smaller than about 5 microns diameter to prevent untimely passage of molten material and filtration does not occur until a substantial pressure drop is applied across the filter (e.g., 10–15 p.s.i.).

Or if desired, the reaction mixture, after the melting period, may be cast in a mold and there allowed to stratify and solidify as a casting. The solidified cerium may then be separated from the casting by cleaving the casting at the metal-salt interface. This method of separation has the advantage that melting of the chlorides does not adversely affect the separation obtained.

In any event, the separated cerium is recovered and further purified, if desired, by heating it in a vacuum furnace to a temperature of at least 850° C. and under a reduced pressure, e.g., about 0.1 mm. of Hg (absolute), for about 30 minutes to 2 hours to remove unreacted reductor metal and residual metal chlorides.

*Example*

The following example is illustrative of the practice of the invention and the invention is not to be considered limited thereto.

As an example of the process of the invention 231 grams of sodium (10 gram-equivalents) are mixed with 740 grams of anhydrous cerium IV chloride (10.5 gram-equivalents) under an inert atmosphere of helium in the lower chamber of a steel reaction vessel having a perforated tantalum plate transversely mounted therein about midway the ends of the vessel. The holes in the perforated plate are of a diameter of about 0.02 inch.

The inert atmosphere is maintained and the reaction vessel is heated until the reaction between the sodium and the cerium chloride is initiated, whereupon the heaters are adjusted to maintain a temperature of 350 to 380° C., but below 400° C., for a period of about 7 hours. At the end of this reaction period the reaction vessel is further brought to a temperature of 745 to 755° C. and maintained in that temperature range for about 20 minutes. Then heating is stopped and the reaction vessel is inverted and allowed to cool. The molten cerium runs through the perforated plate but solid sodium chloride crystals are retained. After the reaction vessel has cooled the separated solidified cerium is removed from the reaction vessel and transferred to a vacuum furnace equipped for collecting volatile materials distilled at high temperatures. The transferred cerium is subjected to a temperature of 880° C. under a reduced pressure of 0.1 mm. of Hg (absolute) for 1 hour. During this heating period the purity of the cerium is increased from a value of 77.5 percent of 96.2 percent cerium by the distillation therefrom of unreacted sodium as well as contaminant sodium and cerium chlorides.

The process of the invention being thus described obvious modifications thereof will be apparent to those skilled in the art and the scope of the invention is to be considered limited only by the hereafter appended claims.

I claim:

1. The improved method of preparing cerium which comprises heating cerium chloride with a reductor metal selected from the group consisting of sodium and barium at a temperature of at least 400° C. and, under an inert atmosphere thereby to cause reduction of the cerium chloride to cerium and oxidation of the reductor metal to reductor metal chloride; and separating said cerium from the reaction mixture while said mixture is at a temperature at which the cerium is molten but the said reductor metal chloride is in the solid state.

2. The improved method of preparing cerium which comprises heating cerium chloride together with sodium at a temperature of at least 400° C. and under an inert atmosphere thereby to cause reduction of the cerium chloride to cerium and oxidation of the sodium to sodium chloride; separating said cerium from the reaction mixture while said reaction mixture is at a temperature at which the cerium is molten but the sodium chloride is in the solid state; and subjecting said separated cerium to a temperature of at least 850° and a reduced pressure below about 0.1 mm. of mercury for at least 30 minutes, thereby to free the separated cerium of sodium chloride and unreacted sodium.

3. In the method of preparing cerium by the reduction of cerium chloride with a reductor metal selected from the group consisting of sodium and barium, by the process in which the reactants are heated together under an inert atmosphere at a sufficiently elevated temperature that the reduction reaction occurs, the improvement in separating cerium from the reaction mixture which comprises: separating cerium from the reaction mixture while said mixture is at a temperature at which the cerium is molten but the chloride of the reductor metal is in solid form.

References Cited in the file of this patent

UNITED STATES PATENTS

| | | |
|---|---|---|
| 1,707,637 | Miesse | Apr. 2, 1929 |
| 1,989,734 | Betterton | Feb. 5, 1935 |
| 2,763,480 | Keller | Sept. 18, 1956 |
| 2,773,760 | Winter | Dec. 11, 1956 |
| 2,782,116 | Spedding | Feb. 19, 1957 |
| 2,787,539 | Conklin | Apr. 2, 1957 |

FOREIGN PATENTS

| | | |
|---|---|---|
| 430,116 | France | Aug. 2, 1911 |
| 489,155 | France | Aug. 31, 1918 |
| 810,428 | Great Britain | Mar. 18, 1959 |
| 591,005 | Canada | Jan. 19, 1960 |

OTHER REFERENCES

Hampel: Rare Metals Handbook, Reinhold Publishing Corp., New York, 1954, pages 333 and 334 relied on.